W. W. VANLANDINGHAM.
COTTON SEED CLEANER AND HULLER.
APPLICATION FILED JULY 29, 1909.
949,607.
Patented Feb. 15, 1910.
2 SHEETS—SHEET 2.
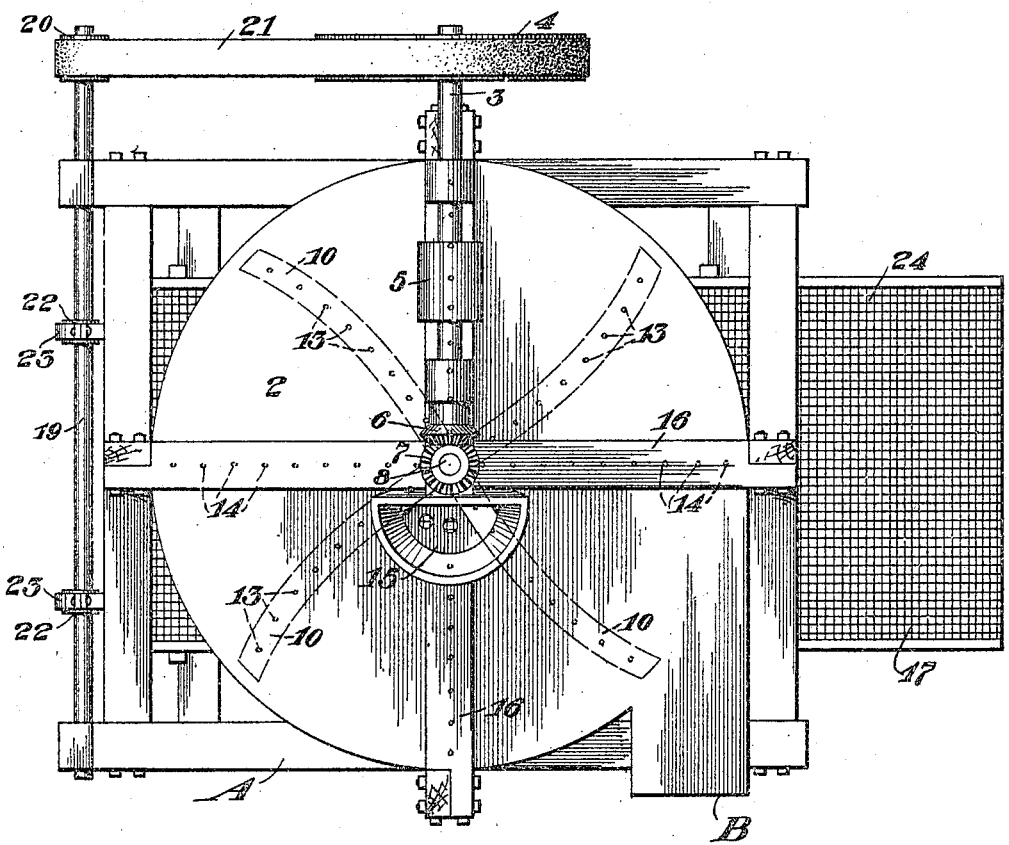
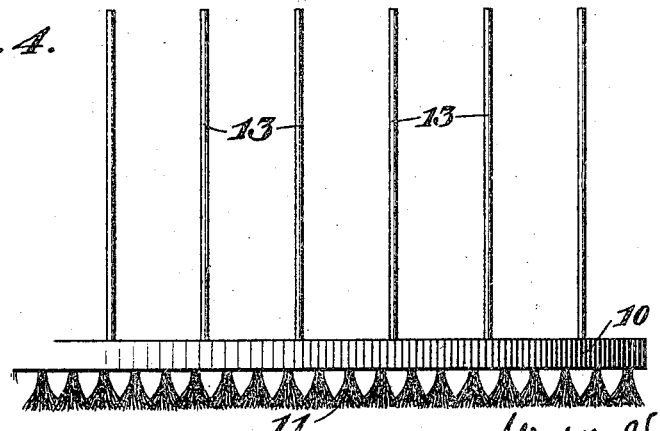

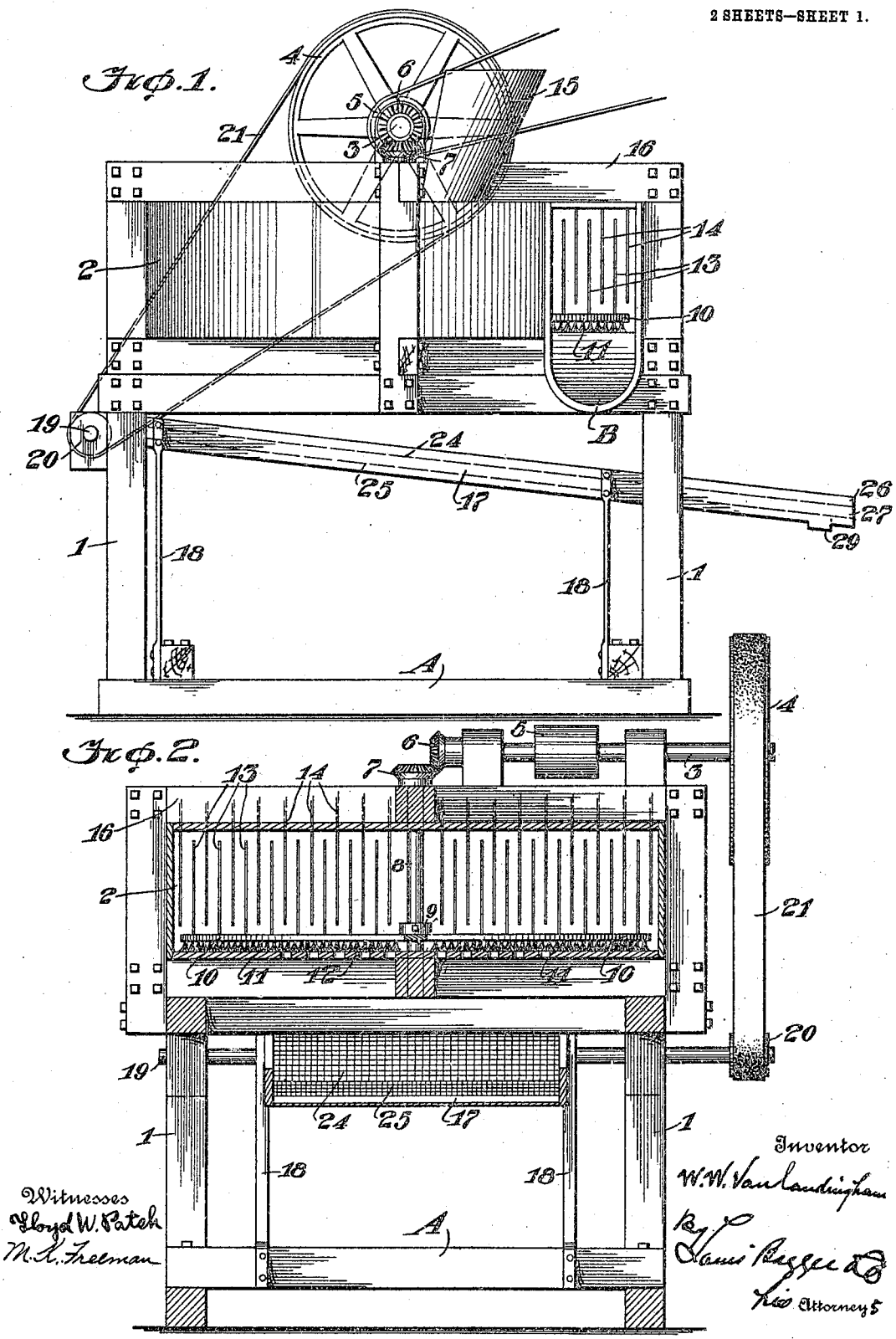

UNITED STATES PATENT OFFICE.

WILLIAM WALLACE VANLANDINGHAM, OF LONE OAK, TEXAS.

COTTON-SEED CLEANER AND HULLER.

949,607. Specification of Letters Patent. Patented Feb. 15, 1910.

Application filed July 29, 1909. Serial No. 510,197.

*To all whom it may concern:*

Be it known that I, WILLIAM WALLACE VANLANDINGHAM, a citizen of the United States, residing at Lone Oak, in the county of Hunt and State of Texas, have invented certain new and useful Improvements in Cotton-Seed Cleaners and Hullers, of which the following is a specification.

My invention relates to an improvement in cotton seed hullers and cleaners, and the object is to provide means whereby the crushed cotton seeds will be agitated and beaten sufficiently to cause the meat or kernels to be removed from the hulls and after the meat or kernels have been removed from the hulls to provide means for the separation of the meats or kernels from the hulls.

The invention consists of certain novel features of construction and combinations of parts which will be hereinafter fully described and pointed out in the claims.

In the accompanying drawings—Figure 1 is a view in side elevation of the machine; Fig. 2 is a transverse sectional view; Fig. 3 is a top plan view; Fig. 4 is a detail view of one of the arms showing the brush and rods on the arms.

A, represents the frame, which is composed of uprights, 1, and mounted thereon is a hopper, 2, preferably cylindrical in shape. Mounted on the frame is a shaft, 3, which is provided with a large pulley, 4. A pulley, 5, is mounted upon the shaft, 3, for causing the shaft to rotate and the pulley is adapted to receive power from any suitable source. At the other end of the shaft, 3, a bevel gear wheel 6 is connected, which meshes with a bevel gear, 7, on a shaft, 8, which shaft extends vertically through the hopper, 2. Mounted on the shaft, 8, is a hub, 9, to which are connected curved arms, 10, 10. Brushes, 11, are connected to the bottoms or lower sides of each of the arms, 10, for causing the kernels or meats of the seeds to pass through the perforated bottom 12 of the hopper. Mounted upon the upper sides of the arms are rods 13, 13, which are adapted to pass between rods 14, 14 extending downwardly from the top of the hopper. In other words, the rods of the hopper and the arms are alternately arranged so that the crushed seeds are thoroughly agitated and beaten, causing the meats or kernels to be removed from the hulls. The crushed seeds are delivered to the hopper through an opening 15 formed in the top thereof. The rods 14 are supported by the cross bars 16 of the frame A, and in which cross bars the shaft 8 is journaled.

Beneath the hopper is a shaker screen 17 which is preferably made of metal. The shaker is supported by means of springs 18 which are connected to the frame. The shaft 19 is mounted in the frame having a pulley 20, over which a belt 21 passes and thence over the large pulley 4, whereby rotary motion is transmitted to the shaft 19. The shaft 19 is provided with an eccentric 22 to which is connected an arm 23. The arm 23 is connected pivotally to a shaker 17 so that as the shaft 19 is revolved a reciprocating motion will be transmitted to the shaker. The shaker is provided with an upper and lower screen. The upper screen 24 is provided with a mesh of about three-sixteenths of an inch for about half the distance of the shaker, and for the remaining distance the mesh of the screen is about one-fourth ($\frac{1}{4}$) of an inch, whereas the mesh of the lower screen 25 is about three-thirty seconds ($\frac{3}{32}$) of an inch. At the bottom of the upper screen a trough 26 is formed for conducting the hulls away from the shaker. Another trough 27, is formed at the end of the lower screen 25 for the coarse meats and hulls which are to be conducted back to the reel (not shown) and treated again, and a third trough 29 is formed at the lower end of the lower screen 25, but directly therebeneath, for receiving the fine meats or kernels which are to be conveyed to the crushing rolls (not shown). The trough 29 is formed in the bottom of the shaker 17 as the fine kernels or meats will pass through the lower screen 25 at the bottom of the shaker down to the trough 29.

As power is transmitted to the shaft 3 the shaft 8 will be caused to revolve through the gears 6 and 7, thereby causing the arms 10 to be rotated and the crushed seeds to be agitated in the hopper and beaten, causing the meats or kernels to be removed from the hulls and the meats are forced through the perforated openings 12 in the bottom of the hopper on to the screen or shaker 17 by the brushes 11. The brushes will also force the coarse hulls out through the hopper at one side where an outlet opening B is formed for the discharge of the hulls. The shaker is being constantly reciprocated during the operation of the arms by the power transmitted to the shaft 19 from the shaft 3 through the belt 21.

From the foregoing it will be seen that I have provided means for the separation of the kernels or meats of crushed cotton seeds from the hulls and that the separating action is obtained both in the hopper and after the meats have been discharged from the hopper.

Having fully described my invention, what I claim as new and desire to secure by Letters Patent is:

1. In a cotton seed huller and cleaner, the combination with a frame, of a hopper having a perforated bottom and an outlet opening, a shaft journaled in the hopper, arms mounted on the shaft, rods on the arms and hopper alternately arranged, brushes on the arms, and means for operating the shaft whereby the meats or kernels are forced through the bottom of the hopper and the hulls discharged through the outlet opening in the hopper.

2. In a cotton seed huller and cleaner, the combination with a frame, of a hopper having openings in the bottom thereof, an outlet opening in the side thereof, a shaft journaled in the hopper, arms mounted on the shaft, rods on the arms and hopper alternately arranged for removing the meats from the hulls of the crushed seeds, a shaker screen beneath the hopper, brushes on the arms, and means for operating the shaft and shaker screen.

In testimony whereof I affix my signature, in the presence of two witnesses.

WILLIAM WALLACE VANLANDINGHAM.

Witnesses:
J. B. JONES,
J. D. EDGE.